March 10, 1953     A. G. THOMAS     2,631,264
MAGNETIC MOTOR
Original Filed May 21, 1946     8 Sheets-Sheet 1
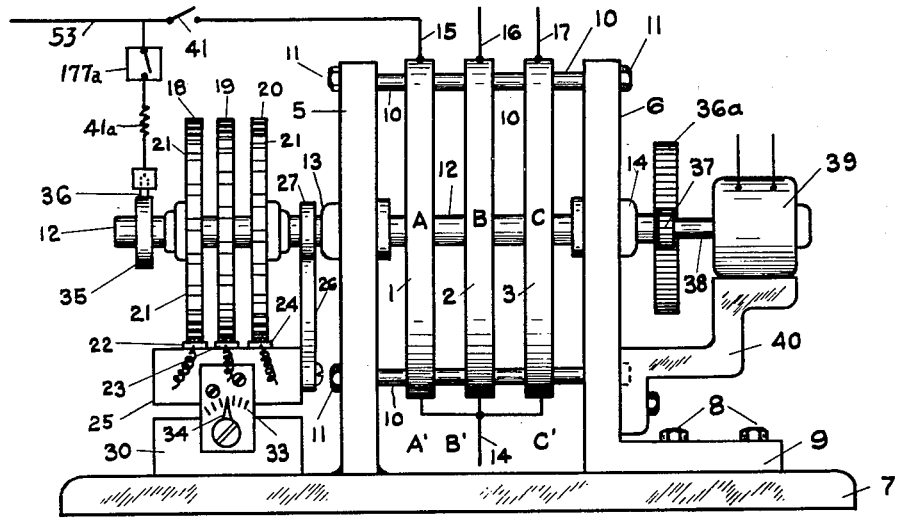
FIG. 1
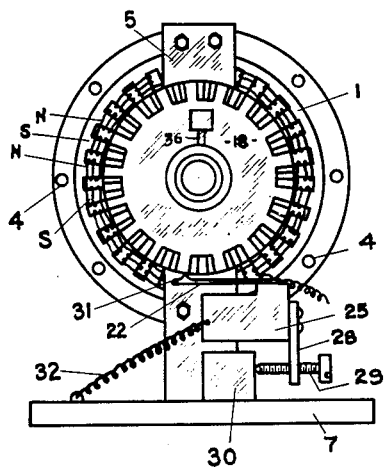     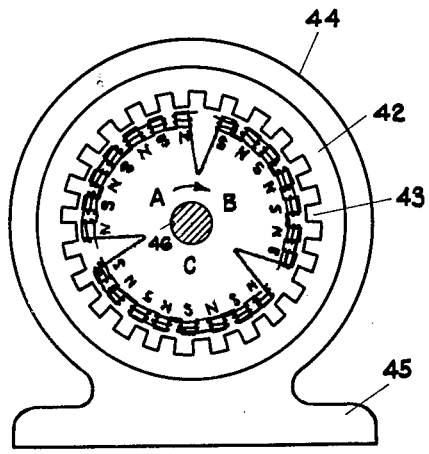
FIG. 2     FIG. 3
*Albert G. Thomas*   INVENTOR.

March 10, 1953 A. G. THOMAS 2,631,264
MAGNETIC MOTOR
Original Filed May 21, 1946 8 Sheets-Sheet 2

Albert G. Thomas INVENTOR.

March 10, 1953   A. G. THOMAS   2,631,264
MAGNETIC MOTOR

Original Filed May 21, 1946   8 Sheets-Sheet 3

Albert G. Thomas
INVENTOR.

March 10, 1953

A. G. THOMAS 2,631,264

MAGNETIC MOTOR

Original Filed May 21, 1946

*Albert G. Thomas* INVENTOR.

March 10, 1953  A. G. THOMAS  2,631,264
MAGNETIC MOTOR

Original Filed May 21, 1946  8 Sheets-Sheet 8

Albert G. Thomas INVENTOR.

Patented Mar. 10, 1953

2,631,264

UNITED STATES PATENT OFFICE 2,631,264

MAGNETIC MOTOR

Albert G. Thomas, Lynchburg, Va., assignor, by mesne assignments, to Kearney & Trecker Corporation, West Allis, Wis., a corporation of Wisconsin Substituted for abandoned application Serial No. 671,204, May 21, 1946. This application September 12, 1949, Serial No. 115,280

16 Claims. (Cl. 318—254)

This invention relates to electromagnetic devices generally and particularly to electric motors and this application constitutes a substitute of my prior application, Serial No. 671,204, filed May 21, 1946.

It is often desirable to have a motor the speed of which can be accurately controlled, especially over a range of speeds. Many prior attempts to accomplish this result have been made but complicated apparatus has been required and even then the motor speed has been difficult to regulate within close limits. An object, therefore, is to provide a motor which will operate at closely regulated, predetermined speeds.

Another object is to provide a motor the speed of which can be controlled within close limits with relatively simple apparatus.

A further object is the provision of a direct current motor the speed of which can be controlled by phase shift methods.

An additional object is the provision of a motor which can be energized from direct current lines and which can be operated as a synchronous motor at various speeds.

Another object is to provide a motor capable of operating in steps or short displacements of the rotor which may be divided into a plurality of phased sections within one stator.

A further and similar object is to provide a motor capable of operating in steps or short displacements of the rotor, the stator of the motor being divided into a plurality of phased sections surrounding the rotor.

An additional object is to provide a motor with a plurality of sections and with a small generator or other control which can be adjusted to determine the relative phasing of the sections, or the energization of one section with respect to the energization or de-energization of a preceding section.

An additional object is the provision of a motor or position indicator, with damping means to prevent exclusive oscillation of the rotor or armature.

A further object is to provide means for energizing the sections of a step motor or other device in proper timed relationship to produce rotation or other effects.

Another object is the provision of suitable circuits for operation of the devices described.

Other objects will be evident in the specification.

In the drawings:

Figure 1 is a front elevation of a motor having a plurality of phased sections, with a commutator for each section and including, optionally, a small generator.

Figure 2 is a left end elevation of the motor shown in Figure 1.

Figure 3 is an end elevation, in part section, of a motor having one stator and a plurality of phased rotor sections.

Figure 4:
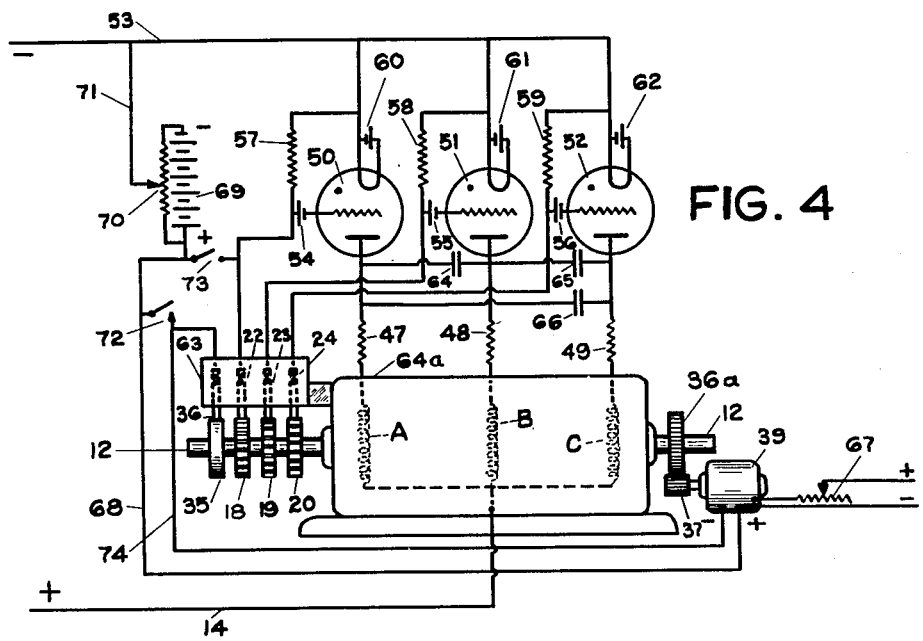
Figure 4 is a schematic illustration of a motor similar to that of Figure 1, and including a circuit diagram.

In Figures 1 and 2 the motor has three sections A, B, and C, having stators 1, 2, and 3, respectively. These stators are preferably laminated, the laminations being held together by rivets 4. Upright 5 may be welded to base 7 and upright 6 is bolted to the base by means of bolts 8 passing through holes in foot 9 of ing sleeves 10 which surround suitable bolts upright 6. The stators are separated by spacpassing through aligned holes in the uprights and stators and which are held securely by nuts 11.

Rotor shaft 12 is supported by bearings 13 and 14 in uprights 5 and 6 and carries a toothed rotor for each stator section. Each stator may have the same number of teeth as its associated rotor and the stator and rotor teeth of any section may be brought into alignment although the teeth of the various stator sections are out of alignment by 1/3 tooth width, or the teeth of the rotor sections are similarly displaced, as desired. The stator teeth are shown as being wound, preferably with consecutive north-south poles as indicated in order to provide short flux paths. Other windings could be used however. The stator and rotor teeth are preferably of the same width with the spacing between teeth equal to the tooth width. Three ends of the stator windings are shown as connected to lead wire 14 and the other ends of the stator windings are shown at 15, 16, and 17, for sections A, B, and C respectively.

Commutators 18, 19, and 20 are suitably fastened to shaft 12 and each has the same number of bars 21 as each rotor has teeth. These bars however extend circumferentially a distance of only 2/3 the circumferential width of a tooth and are spaced two tooth widths apart. Furthermore, either the bars or the associated brushes 22, 23, 24, are circumferentially displaced by 1/3 tooth width from commutator to commutator.

As shown in Figure 2, the brushes are aligned and the commutators are displaced. These brushes are screwed to insulating block 25 which is fastened to arm 26 having integral hub 27 freely rotatable on shaft 12. Arm 28 is fastened to block 25 and has a threaded hole through which screw 29 may be rotated against block 30, fixed to base 7, to vary the angular position of block 25 and brushes 22, 23, 24. These brushes preferably have wedge contacts as 31, in order to make or break connection with a commutator bar or tooth quickly. Tension spring 32, attached to base 7 and block 25, urges the end of screw 29 against block 30 as a stop. A suitable scale 33, and pointer 34 on screw 29, may be provided to indicate the position of the brushes. Slip ring 35 and cooperating brush 36 may be provided. This slip ring may be electrically connected to shaft 12 or directly to the commutators.

Gear 36a is fastened to the end of shaft 12 and is meshed with pinion 37 on shaft 38 of small direct current generator 39. This generator is fastened to bracket 40 which is bolted to upright 6.

In operation, assuming that the brushes are capable of carrying the motor current, brush 36 is connected to one line of a direct current supply by line wire 53, and conductor 14 is connected with the other line of the supply or source of direct current. Brushes 22, 23, and 24 are connected, respectively, to field terminal conductors 15, 16, and 17, by wires not shown. The shaft 12 will then be revolved if the brushes are positioned properly, since the staggered commutators will cause the current to be supplied to the field coils of the three motor sections in proper order to magnetize the associated rotor teeth in order to cause revolution of the shaft.

When the rotor teeth of any section are magnetically pulled into alignment with the stator teeth of the same section, the next succeeding rotor teeth will overlap their associated stator teeth by 1/3 tooth width. Therefore the motor is always in position to start and, if the commutators are of the same diameter as the rotors, the commutator bars or teeth should be 2/3 as wide as the rotor teeth. Fewer bars can be used on the commutators by speeding them up relative to shaft 12, by means of gearing.

If the brushes are adjusted in position so that each succeeding motor section is energized as the rotor teeth of the preceding section are in alignment with the preceding stator teeth, then the motor will operate at maximum speed, with little if any step action. The speed of revolution of the rotors can be reduced by turning screw 29 so that the brushes are shifted to cause energization of succeeding stator sections when the rotor teeth of preceding sections have passed the aligned position so that a magnetic braking action or reverse pull acts on the preceding rotor teeth to reduce the speed thereof. The further the brushes are displaced in this direction the slower will the rotors revolve, within limits as determined by physical dimensions and electrical arrangements. The brushes can be shifted so that the rotors come to a stand-still at the end of forward swing at each energization of a field section. In testing this motor, a very definite step action at this and somewhat greater speeds was observed whereas the rotation is apparently continuous and smooth at higher speeds, say from 50 to 1000 R. P. M. or more. Even though the step or intermittent movement of the rotor is not easily visible there may be more of an effect of that kind at higher speeds than can be readily observed visually.

If the brushes are arranged so that the rotors start back swing before energization occurs the speed of the rotors will be still further reduced. It was found that the speed of this motor can be varied from a few revolutions a minute to high speed by shifting the brushes through an angle of approximately one tooth width or less.

Arm 26 insures that the brushes will be shifted at constant radius. The commutator bars are preferably staggered so that as a bar of a preceding commutator is leaving its brush the forward edge of a bar of the succeeding commutator is just making contact with its brush, considering all the commutators in order.

The speed of this direct current motor can, therefore, be varied over a wide range merely by shifting the brushes a few degrees. This method of operation might be compared to phase shift control of alternating current motors, since the motor sections are phased. High losses such as the heat losses in resistors of usual types of direct current motor controls are avoided.

Advantages of the present motor are that it can be readily and efficiently controlled, that it can be operated in steps or continuously, as desired, and that it can be stopped quickly by shunting the commutator by closing switch 41 connecting the line directly to the field coils of section A. All of the fields can of course be energized to stop the rotor. If the brushes are so positioned that the rotors slow down materially between steps then the motor can be stopped without using excessive stopping current. The motor may be reversed by interchanging leads of the first and third sections.

Generator 39 may be self-exciting or separately excited as desired. The rotor of this generator is preferably driven at considerably higher speed by gear 36 than the speed of shaft 12. The operation of this generator will be described later.

In Figure 3 a phased or step motor with one stator and a rotor with three wound double pole sections of teeth, is shown. Stator 42 has teeth 43 equal in width to the inner circumferential distance between them. The stator teeth are placed uniformly around the circumference and the stator is preferably laminated. This stator is bolted or otherwise fastened to frame 44 integral with base 45. The rotor is suitably fastened to shaft 46 which may carry slip rings or commutators as shown in Figure 1, for connecting the magnetizing coils shown for split rotor sections A, B, and C in proper order to a source of current.

The teeth of each rotor section A, B, and C, are equal in width to the stator teeth and are similarly spaced. Each rotor tooth is wound, with a continuous winding for each section and arranged so that each rotor tooth of a section is of opposite polarity from an adjacent tooth, as indicated. The two terminals of the winding for each section are connected to suitable slip rings (not shown) on shaft 46 so that the windings may be energized in proper order to cause rotation.

If the coils around the teeth of section A, due to being magnetized, have caused the rotor teeth of that section to be aligned with the adjacent stator teeth, then, due to the spacing between sections, the teeth of rotor section B will overlap the adjacent stator teeth by ⅓ tooth width. Now if the coils of section B are energized the rotor teeth of that section will be pulled into alignment with the adjacent stator teeth so that the rotor will revolve in clockwise direction for ⅔ of a tooth width. The teeth of section C are so spaced that they will then overlap the adjacent stator teeth by ⅓ tooth width. When section C is then energized the rotor will be similarly advanced by ⅔ tooth width. Therefore if three commutators, as in Figure 1, or an electronic or other distributor is employed to cause energization of the rotor sections in repeated consecutive order, the rotor and shaft 46 will be revolved. This revolution can be made to occur in steps or virtually continuously, in manner previously described.

An advantage of the construction shown in Figure 3 is that only one stator section need be used and the over-all size of the motor can be greatly reduced. This design is especially suitable for small motors since the manufacturing operation can consist largely of stamping out the various parts. Such small motors, particularly when operated in steps as position indicators or otherwise, are very useful in connection with instruments of various kinds, including radio compasses, liquid level indicators, calculating machines, and others.

In Figure 4, the motor of Figure 1 or a similar motor is shown connected with an electronic control circuit. Equivalent parts are given the same numerals as in Figures 1 and 2. The field coils of sections A, B, and C are shown dotted. These coils are connected at their ends by conductor 14 and their other ends are connected to resistors 47, 48, and 49, respectively. These resistors lead to the anodes of the respective gaseous relay tubes 50, 51, and 52, the cathodes of which are electrically connected by negative line wire 53, the positive line wire 14 being connected as described.

Batteries or other potential sources 54, 55, and 56 are connected in series with the respective grids of tubes 50, 51, and 52 and in series with resistors 57, 58, and 59 the other ends of which are connected to the cathodes as indicated. Sources 54, 55, and 56 bias the grids negatively, normally. The cathodes are supplied energizing current by batteries or other sources 60, 61, and 62.

Insulating block 63 is fastened to motor housing 64a, fixedly or movably, and carries spring-pressed brushes 36, 22, 23, 24 aligned with slip ring 35, and commutators 18, 19, and 20 which may be of the type previously described. Condenser 64 is connected between the anodes of tubes 50 and 51. Condenser 65 is connected between the anodes of tubes 51 and 52; and condenser 66 is connected between the anodes of tubes 50 and 52.

Generator 39 is driven from shaft 12, through gears 36a and 37 and is shown as having a separately excited field the current through which may be varied by means of adjustable resistor 67. The positive output terminal of the generator is connected by conductor 68 to the positive terminal of battery 69 which should have a higher potential than the bias batteries. Potentiometer 70 is connected across battery 69 and the movable contact of the potentiometer is connected to line 53 by conductor 71. The negative output terminal of generator 39 is connected to brush 36 by means of conductor 74. Switch 72 is connected between conductors 68 and 74 so that the generator may be short circuited or otherwise cut out of circuit when desired.

In operating this circuit, assume first that switch 72 is closed and that generator 39 is out of mesh or is not energized. Then if brushes 22, 23, and 24 are properly positioned relative to staggered electrically connected commutators 18, 19, and 20 these brushes will distribute current to resistors 57, 58, and 59 in correct sequence to cause tubes 50, 51, and 52 to "fire" or conduct in the same sequence to distribute line current to the proper sections of the motor to cause rotation thereof. The current from battery 69 will pass through switch 72, brush 36 and from the commutator bar that happens to be in contact with its associated brush at the instant of firing. Slip ring 35 and the commutator bars are electrically connected. Since battery 69 is of higher potential than bias batteries 54, 55, and 56, the current passing through resistors 57, 58, and 59 and returning through line conductor 53 will create a positive potential drop in each resistor to overcome the associated bias, at proper times. It is assumed, of course, that the potentiometer is properly adjusted. As any one tube is fired the preceding tube is extinguished by means of condensers 64, 65, 66.

This circuit is an electronic equivalent of the circuit indicated in Figure 1. The commutators distribute small curents to the grid circuits of gaseous relay tubes which in turn control the relatively heavy field currents. It was found that the motor can be very flexibly controlled in this manner, with negligible arcing at the brushes, due to the small currents. The motor will very quickly accelerate from a low speed of say 10 to 15 R. P. M. to many hundreds of revolutions per minute or higher by shifting the brushes through only a few degrees. By closing switch 73, connected between conductor 68 and resistor 57, the tube 50 can be caused to fire constantly so that the motor can be brought to a stop within the space of one tooth width for moderate speeds.

This switch can be controlled by electronic or mechanical relay action if desired.

Another mode of operation is to open switches 72 and 73 and to energize the field of generator 39 which may have a relatively small armature which can quickly be accelerated or reversed without excessive strain. In this case the brushes should be adjusted not to control the time of firing of the tubes but merely to act as distributors to shift the grid currents to the proper tubes in correct sequence. The firing is controlled by generator 39 in conjunction with battery 69. It will be observed that the generator voltage opposes the firing voltage from battery 69. Therefore as long as the motor shaft 12 is rotating forward at sufficient speed the generator voltage will be high enough to overcome or to reduce the net potential of battery 69 so that the current through any grid resistor is not sufficient to provide a positive potential drop high enough to fire the associated tube. When, however, the speed of rotation of shaft 12 is reduced sufficiently, as happens when the rotor teeth swing past alignment with the stator teeth of an energized section of the motor, then the voltage output of the generator is reduced and battery 69 causes firing of the next tube the grid circuit of which has been connected in circuit by the commutator.

The point of firing of each succeeding tube, with respect to the relative positions of the rotor and stator teeth, can be predetermined for a given load by means of battery 69 or generator 39 or both. For instance, if potentiometer 70 is adjusted so that the effective battery voltage is decreased, then the next succeeding tube will be fired when the rotor teeth are further displaced from the stator teeth, in forward direction, since the generator voltage output will be less at that point. Similarly, if the effective voltage of battery 69 is increased, assuming that the firing occurred with the rotor teeth past the associated stator teeth, then the next succeeding tube will be fired when the rotor and stator teeth are nearer in alignment, since the opposing voltage of the generator will be relatively decreased.

Therefore, by varying the setting of potentiometer 70 to vary the effective voltage of battery 69, or by varying the field strength of the generator, or both, the speed of rotation of the motor shaft can be smoothly controlled from a very low speed to full speed. Furthermore, the mode of operation can be varied from pronounced step action to continuous rotation as desired. The motor can be reversed by interchanging the leads of the first and third field or rotor windings by means of a suitable switch or relay, when the generator is not in circuit. When the generator is used the field current of the generator can be reversed in direction simultaneously with the interchange of the motor section connections, by means of connected relays, switches or the like.

Figure 5:
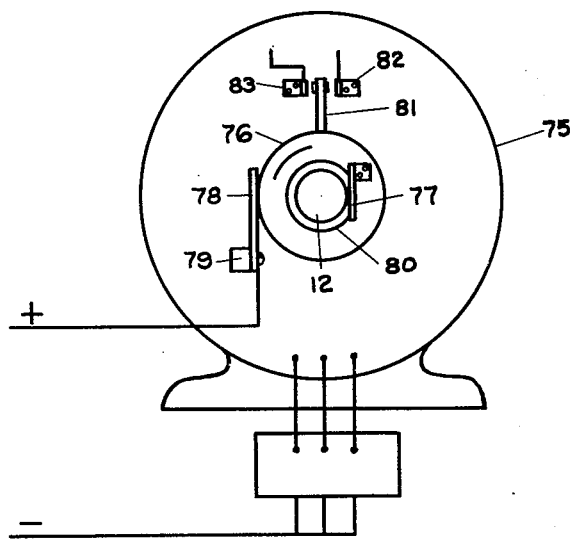
Figure 5 is an end elevation of a motor having a make-and-break control to cause energization of the sections of the motor at proper times.
Figure 6:
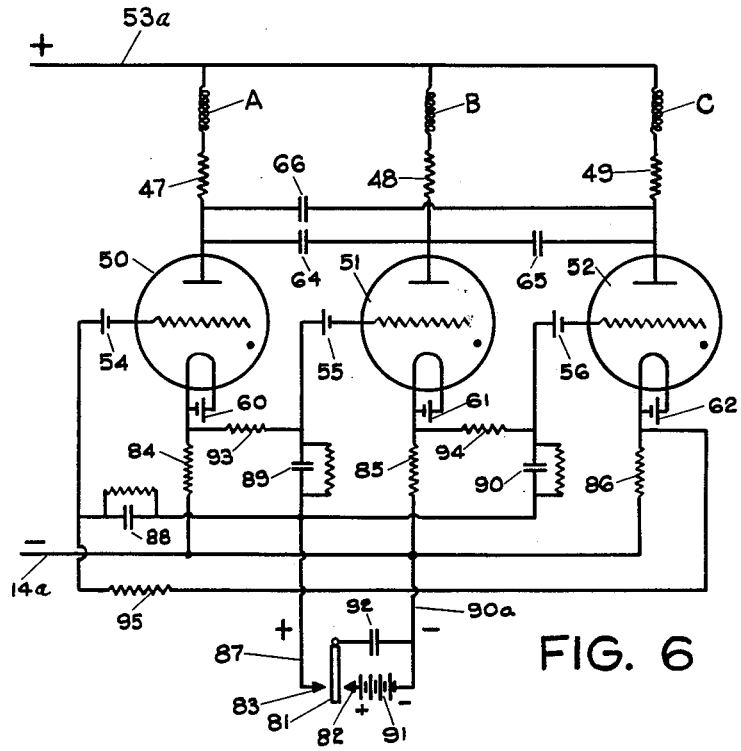
Figure 6 is a circuit diagram for controlling the motor by means of the device shown in Figure 5, and for other modifications.

Figure 5 illustrates the construction of a make-and-break arrangement for use with the circuit of Figure 6, in order to distribute firing pulse to the gaseous relay tubes, electronically rather than mechanically. Motor 75 is of the type described and has shaft 12 with surrounding collar 76 having attached spring clip 77 adapted to press against shaft 12 to produce friction. Resilient brush 78 presses against metal collar 76 and is supported on insulating block 79 attached to the motor. Collar 76 may be insulated from shaft 12 by fibre sleeve 80 and element 77 may likewise be insulated from the collar. Metal contact arm 81 is fastened to collar 76 and may strike contact 82 in forward direction or contact 83 in reverse direction. These contacts are attached to the motor frame but are insulated from it.

Now, in Figure 6, the energizing windings for the three motor sections are represented by the coils A, B, and C, connected in series with resistances 47, 48, and 49 and with interconnected condensers 64, 65, and 66, as previously described. The tubes 50, 51 and 52 are as before but the grid circuit connections are different. In this case resistances 84, 85, and 86 are connected in series with the tubes 50, 51, and 52 respectively and have a common terminal in negative line conductor 14a which, in conjunction with positive line 53a, can supply current to the motor sections.

The cathode of tube 50 is connected through resistor 93 with the positive terminal of grid bias battery 55; the cathode of tube 51 is connected through resistor 94 with the positive terminal of bias battery 56; and the cathode of tube 52 is connected through resistor 95 with the positive terminal of bias battery 54. The positive terminals of the three grid bias batteries are also connected to conductor 87 through the condensers 88, 89, and 90 as shown. These condensers may be shunted by high resistances of several megohms in order to prevent trapping of charges on the condensers.

Conductor 90a is connected with line 14a, to the negative terminal of battery 91 and to a terminal of condenser 92 the other terminal of which is connected to arm 81 of a single pole, double throw relay or switch having contacts 82 and 83 connected as indicated. This relay can be the same as shown in Figure 5.

It is obvious that when arm 81 touches contact 82, condenser 92 will be charged by battery 91 so that arm 81 will be positive if it is moved over to touch contact 83. When this happens condenser 92 will quickly discharge through condensers 88, 89, and 90 in a pulse, momentarily to produce potential drops across resistors 93, 94, and 95 connected between the grid bias batteries 55, 56, and 54 and the cathodes of tubes 50, 51, and 52 respectively. These potential drops tend to overcome the grid bias voltages to make the grids positive but are not sufficient, of themselves to do so. If, however, any one tube is conducting, the positive potential drop across its series resistor 84, 85, or 86, as the case may be, will cancel part of the negative bias of the next succeeding tube so that the next pulse will fire that tube only. Then succeeding pulses will fire successive tubes, one at a time. This method of predisposing a tube to fire due to current traversing another tube is well known. As the tubes are fired in order, the motor sections A, B, and C are fired in sequence to cause rotation of the motor shaft.

In operation, friction between sleeve 80 and shaft 12 (Fig. 5) causes arm 81 to be pressed against contact 82 during forward rotation so that condenser 92 (Fig. 6) will receive charge during that time. When, however, the rotor and shaft start backswing due to magnetic pull tending to restore alignment, then arm 81 will be quickly shifted over against contact 83 so that the condenser discharges, creating another firing pulse. By this means the motor section windings are energized in sequence at the end of forward swing of the rotor teeth or at the beginning of backswing.

Another mode of operation is to make arm 81 resilient and to interchange the positions of contacts 82 and 83. Arm 81 would then be biased to touch contact 82 normally but would be thrown forward against contact 83 to produce a firing pulse whenever the rotor is suddenly decelerated. By regulating the tension or inertia of arm 81 the firing point could be more or less predetermined, at chosen relative positions of the rotor and stator teeth, between the aligned position and the end of forward swing.

Figures 7, 9:
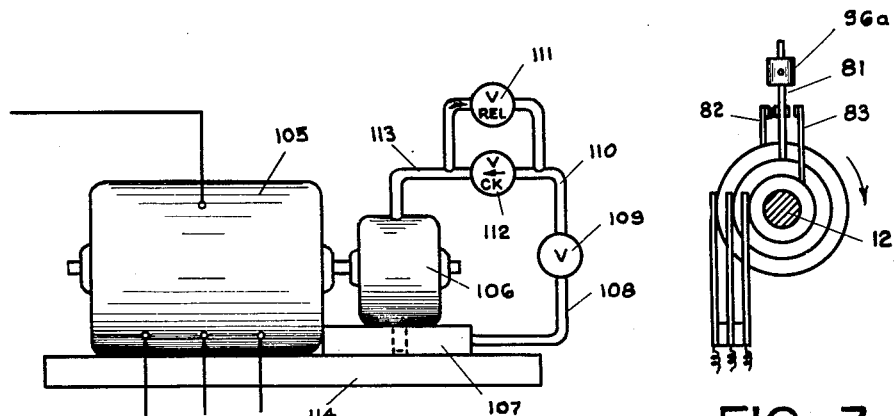
Figure 7 is a fragmentary end view of a control device similar to that of Figure 5, but having an adjustable timing feature.
Figure 9 is a front elevation of a plural section or phased motor or positioning device, with associated pneumatic, hydraulic or similar damping means.

As shown in Figure 7, the resilient arm 81 could have adjustable weight 96a for varying the effective inertia of the arm. Slip rings and brushes are shown for connecting the arm and contacts.

Figure 8:
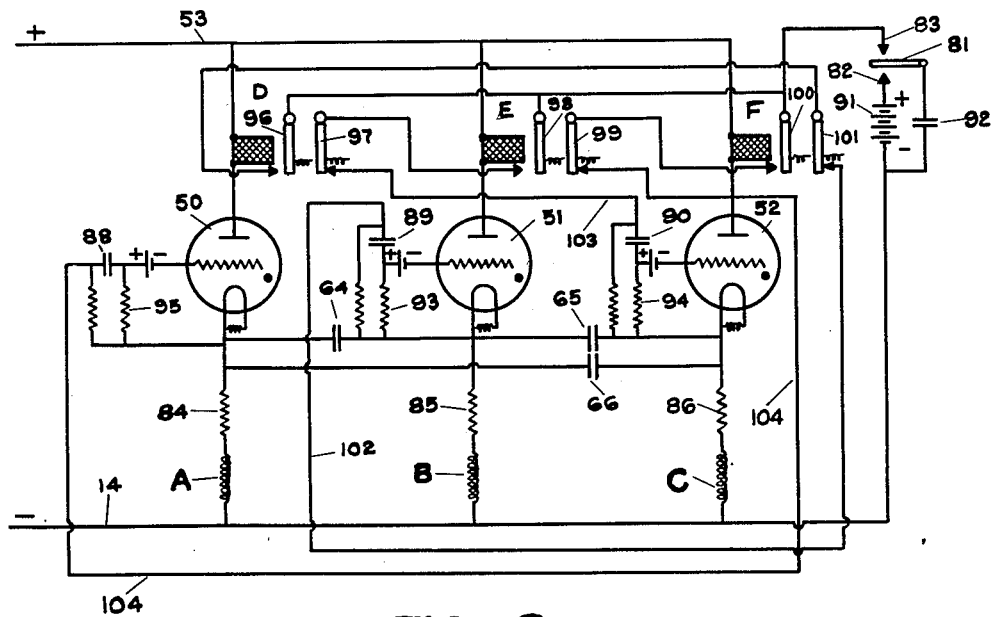
Figure 8 is a modified circuit diagram based upon the circuit shown in Figure 6.

In Figure 8 the circuit is similar to that shown in Figure 6, like parts being given like designations. The motor section energizing coils A, B, C, and the quenching condensers 64, 65, and 66 have been moved to the cathode side of the tubes as indicated. In this circuit double pole, single throw relays D, E, and F are connected in the anode leads of tubes 50, 51, and 52 respectively. These relays are for the purpose of improving the stability and reliability of operation of the circuit. It was found that they improve the operation. Electronic relays can of course be substituted for the mechanical relays. High resistance leaks are shown connected across condensers 88, 89, and 90. These leaks are not essential but tend to improve operation.

Relays D, E, and F have arms 96—97, 98—99, and 100—101, respectively. Arms 96, 98, and 100 are normally not touching their adjacent contacts and are connected with contact 83. Arms 97, 99, and 101 normally touch their adjacent contacts which are connected respectively with condensers 90, 88, and 89. It is obvious from the connections shown that if, for instance, tube 50 conducts current, relay D will be energized to connect pulse contact 83 with condenser 89, through arms 96, 101, and conductor 102. Therefore, tube 51 alone will be connected to receive the next pulse and when that tube fires, tube 50 is extinguished and relay E is energized to connect contact 83 to condenser 90, through arms 98, 97 and conductor 103 so that tube 52, only, will be connected for the next pulse. Similarly, when tube 52 fires tube 51 is extinguished and relay F is actuated to connect condenser 88 with contact 83, through arms 100, 99, and conductor 104 so that tube 50, only, is connected to receive the next pulse. As each relay is energized, arms 97, 99, and 101 are pulled away from their contacts, in proper order, so that isolation is maintained ahead of the next tube to be fired.

In Figure 9, motor 105 is similar to the motors described and drives pump 106 connected to its shaft. This pump may be of any suitable type, such as a piston, gear, vane or similar kind, and is mounted on tank 107 holding oil or hydraulic pump fluid of any suitable kind. Pipe 108 leads from tank 107 to control valve 109 to which is connected pipe 110. This pipe leads to pressure relief valve 111, which may be adjustable, and to check valve 112, connected in parallel and to pipe 113 entering pump 106. When the rotor of motor 105 is revolving in steps in forward direction, fluid will be drawn through pipe 108 and through check valve 112 into the pump 106. When the rotor reverses in direction for each step, fluid will be pumped out through pipe 113, through pressure relief valve 111 and into the tank through valve 109 and pipe 108. By regulating the spring tension of valve 111 the degree of resistance or damping offered to the rotor on backswings can be controlled. Valved inlet 114 for the pump could be provided if desired. The valves could be arranged to pass fluid in both directions, so that an orifice would limit flow to damp the motor for both forward and reverse movement.

By the means described, the oscillation of the rotor can be controlled when the motor is energized periodically to move in definite steps, as in machine tool controls, calculating machines, gun pointers, or the like. The resistance to backswing offered by the pressure relief valve can be varied until there is little if any backswing, if such correction is required. A governor or control, operated by the speed of the motor shaft, can be used to cause operation of the relief valve or other resistance-creating means during forward rotation, after the rotor teeth have passed the aligned position with respect to the stator teeth. Oscillation can then be controlled at higher speeds, since it is not necessary to wait for backswing. The valves, preferably, should be of fast acting type. Air can be used as the fluid if desired.

Figure 10:
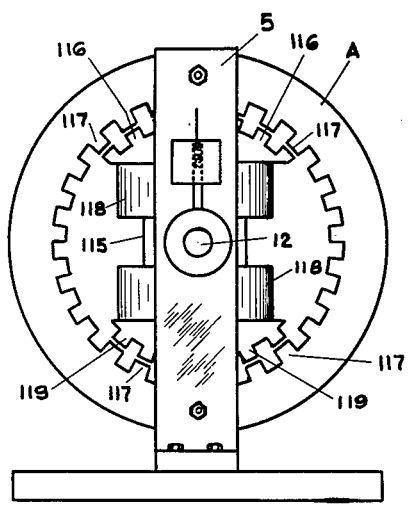
Figure 10 is an end elevation of a motor having a plurality of sections including wound rotors.
Figure 11:
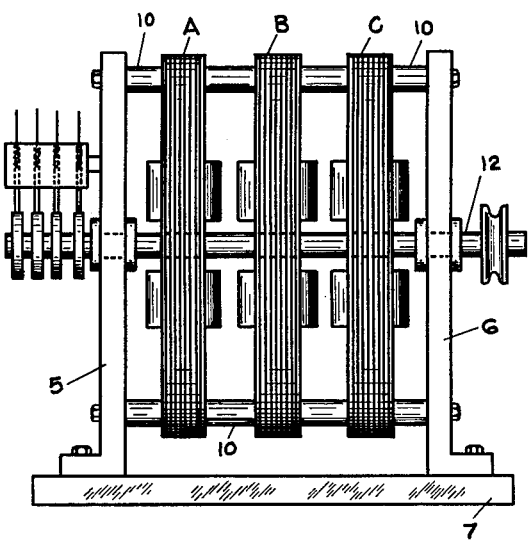
Figure 11 is a front elevation of the motor shown in Figure 10.

In Figures 10 and 11, the motor is generally similar to that shown in Figure 1 but in this case the rotor is wound. Like parts are given the same reference characters. Upright 5, however, is shown as bolted to base 7 instead of being welded. The rotors in this case are modified and are preferably laminated. The rotors are suitably mounted on shaft 12 and are similar to that for section A, as shown in Figure 10. Rotor 115 has a centrally located rectangular portion and teeth 116 and 119 at the ends of the rectangular portion. These teeth may be arranged in flared segments as indicated and all the rotor teeth for any one section, A, B, or C, can be simultaneously aligned with adjacent stator teeth 117. The rotor teeth or stator teeth of the various sections may be staggered as previously described.

Magnetizing coils 118 are wound around the rectangular portion, on either side of shaft 12, and are preferably connected in series. These coils are wound so that teeth 116 will be magnetized with north poles when teeth 119 are magnetized with south poles, and vice versa. The rotors for sections B and C are similarly wound.

Shaft 12 carries four insulated slip rings one of which is electrically connected with a common terminal of the three rotor windings and the other three terminals of the windings are connected to the remaining slip rings so that the windings of the three rotors can be energized in proper order through the slip rings and brushes to cause rotation in the manner described. The magnetized rotor poles will induce opposite poles in the adjacent stator teeth and the magnetic flux can return through the stator ring.

This modification can be easily assembled from stampings and the coils can be machine wound and readily placed over the rotors which may have detachable end pieces, or the coils can be wound on the rotors.

Figure 12:
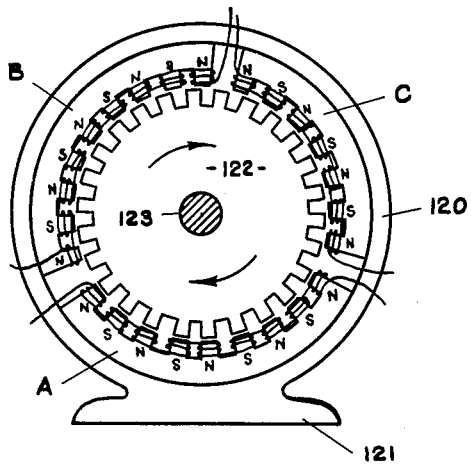
Figure 12 is an end elevation, in part section, of a motor having one rotor and a plurality of wound stator sections surrounding the rotor.

Another modification is shown in Figure 12. The stator teeth are arranged in three sections A, B, and C, held in position by ring 120 which may be integral with base 121. In this case there is only one rotor 122 which is mounted on shaft 123 which may be supported in bearings similarly to shaft 12, or otherwise. In this motor and in other modifications of the invention the rotors and stators are preferably made of iron or steel of good magnetic permeability such as silicon steel or the like. Similarly, the rotor and stator teeth are preferably of the same width and are separated by one tooth width so that the teeth may be aligned. The stator sections A, B, and C, however, are in this case so placed that when rotor teeth are aligned with the stator teeth of section A the forward edges of other rotor teeth will overlap the associated stator teeth of section B by ⅓ tooth width, and other rotor teeth will be caused to overlap the stator teeth of section C by ⅓ tooth width when rotor teeth are brought into alignment with the stator teeth of section B.

The stator teeth of the three sections are wound with magnetizing coils connected in series, for each section, and arranged to form alternate north and south poles for the teeth of each stator section, when the coils are energized. Therefore, when the section windings are energized in sequence, by any of the methods described, or in other suitable manner, the stator teeth poles will induce opposite poles in the rotor teeth to cause movement of the rotor step-by-step or practically continuously as desired. Means for controlling the energization of the various section windings have been described and can be applied to this modification. This design is simple and can be readily made and assembled. Where space is at a premium the motor can be made, in this way, so that it will be relatively small.

Figure 13:
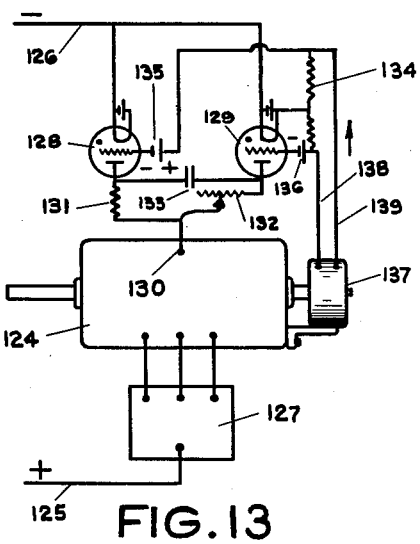
Figure 13 is a diagrammatic representation of a plural section motor and associated control circuit.

In Figure 13, motor 124 is of the general type previously described and has three field or rotor sections supplied current in proper sequence by means of positive and negative line conductors 125 and 126 and distributor 127 of any suitable kind, as described, and connecting wires as indicated. Gaseous relay tubes 128 and 129 have their anodes connected to the common terminal 130 of the motor windings, through resistors 131 and 132 respectively. Quenching condenser 133 is connected between the anodes to extinguish one tube when the other is fired. The cathodes of the tubes are connected to negative line 126 and the grid of tube 128 is connected to one terminal of resistance 134 through negatively biasing battery 135. Similarly, battery 136 biases the grid of tube 129 negatively and the positive pole of this battery is connected to the other terminal of resistance 134, the mid-point of which is connected to the cathodes or line 126.

Small direct current generator 137 is similar to the small generator previously described and is driven by the shaft of motor 124, through gearing or otherwise. The output conductors 138 and 139 from the generator are connected to the terminals of resistance 134 as indicated and the polarity is such that current from the generator will pass through the circuit including resistance 134 in the direction of the arrow, when the rotor of motor 124 revolves in forward direction and the current will reverse in direction when the rotor starts to swing back as during step operation.

The flow of current through resistor 134, when the rotor is travelling forward, will therefore create a positive bias to fire tube 128 and a negative bias to add to the negative bias of tube 129. When the rotor starts back swing, armature rotation of generator 137 will be reversed so that the current passing through resistor 134 will be reversed to apply a net positive bias to tube 129 and negative bias to tube 128. Therefore, on forward steps of the rotor, tube 128 will be conducting and on backswing tube 129 will be conducting. Only one tube conducts at a time since when one is fired condenser 133 is instrumental in extinguishing the other.

Variable resistor 132, or another resistor in circuit, is adjusted so that tube 129 will pass much less current than tube 128. This reduced current, which is applied during backswing, can be adjusted so that there will be greatly reduced magnetic pull on backswing or virtually none at all. This will reduce the tendency to oscillate. The full magnetizing current can be passed through tube 128 to accelerate the rotor for each step and then to decelerate it after the rotor teeth pass alignment with the stator teeth but when backswing starts, the magnetic force tending to pull the rotor backward is very much reduced, or eliminated if desired. This force can be regulated to be just enough to prevent the rotor from "free wheeling" so that practically a periodic operation can be obtained. By means of the same general principles, it is possible to reduce the magnetic pull for forward rotation so the accelerating force is diminished before the rotor reaches the aligned position, for each step. This prevents excessive over-travel for each step. As a further refinement, the magnetic reverse pull can then be increased automatically, after the rotor teeth pass the position of alignment.

The bias voltages, the generator output, or other factors can be varied with the load in order to time the operation of the circuit with the shifting of current to the various motor sections, in order to prevent an oscillating condition between tubes 128 and 129, or otherwise.

Figure 14:
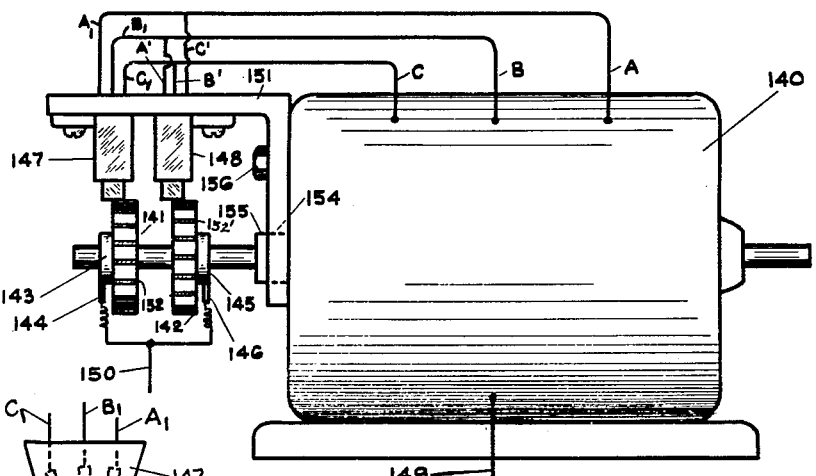
Figure 14 is a front elevation of a plural section motor or positioning device with a plurality of commutators and brushes for minimizing oscillations.
Figure 15:
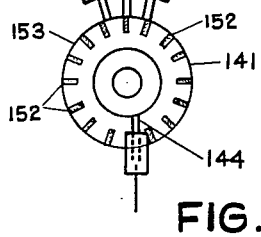
Figure 15 is an end view of a commutator and brushes shown in Figure 14.

In Figure 14, three-section motor 140 and associated commutators 141 and 142 are shown diagrammatically. Commutator 141 has electrically connected slip ring 143 and brush 144, and commutator 142 has electrically connected slip ring 145 and associated brush 146. Insulating blocks 147 and 148 have three brushes each, arranged as shown in Figure 15. The three brushes in block 147 are connected respectively to conductors $A_1$, $B_1$, and $C_1$, leading to the three section winding A, B, C, of the motor which is similar to those described in this or the prior application. The common terminal of these windings is connected to conductor 149 which is adapted to be connected to one line of a preferably direct current supply. The other line 150 is connected to brushes 144 and 146.

Bracket 151, fastened to the motor, serves as a support for the feet attached to blocks 147 and 148. These feet and blocks could, if desired, be made slidable on the bracket to bring more or less brush area in contact with the commutators, in order to vary the current supplied to the motor. Suitable resistors could be used, however. The vertical leg of the bracket is bored at 154 to be rotatable about bearing shoulder 155 attached to the motor. The brushes can therefore be shifted circumferentially and clamped in place by bolt 156, cooperating with a suitable slot in the bracket.

Commutators 141 and 142 are constructed as shown in Figure 15. Conducting elements 152 of metal are imbedded in insulating disc 153 of plastic material or the like. Elements 152 are electrically connected and are spaced so that as one leaves the brush connected with conductor $C_1$, the next element makes contact with the brush connected with conductor $A_1$. Therefore as the elements 152 are swept under the brushes the current is distributed to the first, second, and third section windings in turn. Slip ring 143 is electrically connected with elements 152.

Commutator 142 is constructed in similar manner to commutator 141 and the brushes in block 148 are arranged similarly to the brushes in block 147. In the commutator 142, the conducting elements 152¹ need not be of the same width and spacing as the conducting elements 152 in commutator 141. Furthermore the conducting elements of commutator or distributor 142 may be displaced or staggered with respect to the equivalent elements on commutator 141.

Observation of Figure 12, for illustration, shows that when the rotor teeth are in alignment with the stator teeth of section A, the rotor teeth adjacent the stator teeth of section C are in position to produce reverse torque on the rotor if the field windings of section C are energized. Similarly, when the rotor teeth adjacent any field section are in alignment, energization of the windings of the third section, with respect to the first aligned section, will produce reverse or braking torque.

In Figure 14 the three brushes in block 148 are connected with conductors A¹, B¹, and C¹ and are placed in the same order as the brushes connected with conductors A₁, B₁, and C₁ respectively. Therefore, if conductor A₁ is connected to conductor C¹ the windings of section C can be energized while the windings of section A are energized. By choosing the conducting elements 152¹ of commutator 142 of proper width and by fastening this commutator to the motor shaft in proper phased relationship as related to commutator 141, the windings of section C can be energized when the rotor teeth adjacent the stator teeth of section A are in any desired position relative to the stator teeth. For instance, section C can be energized just after the rotor teeth adjacent section A pass aligned position to exert a retarding or damping action on the rotor at that time until the end of forward stroke for each step. This damping action can be discontinued at any position by adjusting the angular position of the brushes in block 148 or by having the brushes of trapezoidal cross section so that contact with the commutator elements 152¹ will be made at different phase positions. Block 148 can be shifted axially to produce this effect, and circular shifting can also be employed.

Another mode of operation is to apply the reverse torque from section C before the rotor teeth are aligned with the stator teeth of section A. The reverse torque tends to prevent over-travel or magnetic swing so that if proper adjustments are made, the rotor teeth will move into alignment with the stator teeth of section A with minimum oscillation.

Similarly, if conductor B₁ is connected with conductor A¹ and if conductor C₁ is connected with conductor B¹, then the damping or braking effect, as described, can be applied during magnetization of sections B and C in proper timed relationship. This construction is especially desirable when the electromagnetic device is used as a position indicator or step motor the rotor of which will move one step as one section of the windings is energized. By means of the damping described, the rate of application of the energization or pulses can be widely varied without causing erratic operation due to oscillations of the rotor.

Figure 16:
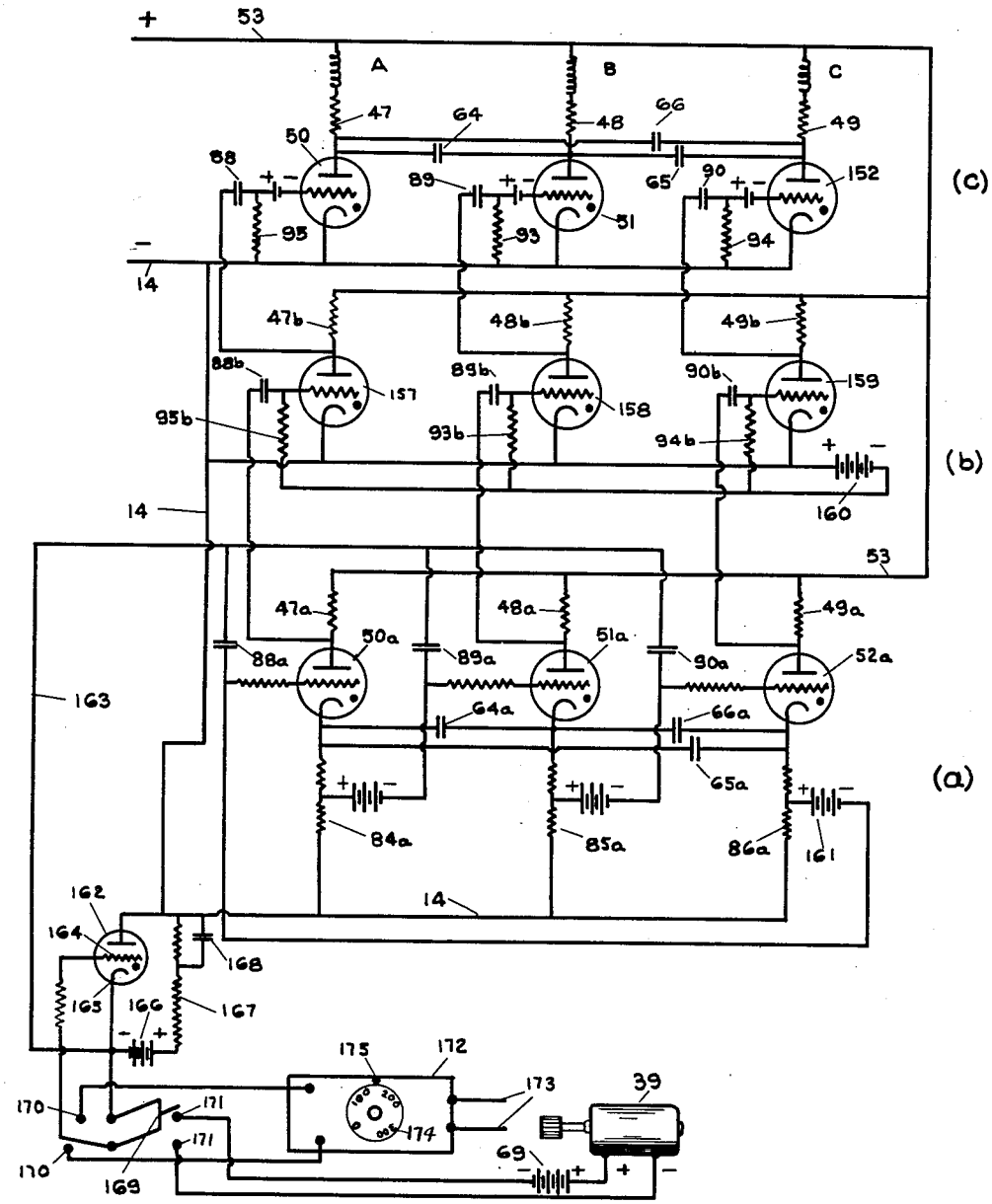
Figure 16 is a circuit diagram for controlling motors described.

The circuit shown in Figure 16 is basically similar to the circuit of Figure 6 but includes isolating or buffer stages of tubes. Like components are given similar reference characters. The circuit may be considered in three stages, the timing or control stage (a) including relatively small gaseous relay tubes 50a, 51a, and 52a, connected with resistors 47a, 48a, and 49a in the anode circuits. Grid pulse feed condensers 88a, 89a, and 90a, equivalent in function to condensers 88, 89, and 90, are shown. Current limiting resistors in series with the grids are also shown. Battery 161 normally biases the grids of tubes 50a, 51a, and 52a negatively. Other components function as described in connection with Figure 6.

Buffer stage (b) includes high vacuum tubes 157, 158, and 159 the grids of which may be made more negative by pulses through condensers 88b, 89b, and 90b or by producing potential drops across resistors 95b, 93b, and 94b, respectively. The grids are normally negatively biased by battery 160. Condensers 88b, 89b, and 90b are respectively connected to the anodes of tubes 50a, 51a, and 52a so that when each tube fires or conducts current, the potential drop across its connected resistor 47a, 48a, or 49a, will produce a sudden negative charge on the grid of tube 157, 158, or 159. These pulses will be transferred to make the grids of tubes 50, 51, and 52 positive at proper times, through condensers 88, 89, and 90, connected to the anodes of tubes 157, 158, and 159 as shown.

The connections of section (c) are equivalent to the circuit diagram of Figure 6, the windings A, B, and C representing the motor section windings. Tubes 50, 51, and 52 may be of relatively large size to carry heavy motor currents. The negative line 14 is connected to all the groups (a), (b), and (c) as shown. While the timing group (a) and buffer group (b) controlling the power group of tubes (c) are not essential, it was found that stability is often improved with this arrangement.

Pulse geneator tube 162 may comprise a small gaseous relay tube having the anode connected to negative line 14 and its cathode 165 to condensers 88a, 89a, and 90a, by means of conductor 163. The positive terminal of battery 166 is connected to the anode of tube 162 through resistor 167, a portion of which is shunted by condenser 168. The negative terminal of battery 166 is connected to cathode 165 which is also connected with one blade of double pole, double throw switch 169. The other blade of the switch is connected with grid 164. One pair of switch contacts 170 are connected with the output of sine wave or other oscillator 172 which may be connected to a suitable source of electrical energy by means of conductors 173. This oscillator may be of standard or known type and has dial 174 which can be rotated with reference to fixed mark 175 to provide calibrated frequency of output. If desired, the dial may be marked in revolutions per minute of the motor, considering the number of poles and the number of sections of the motor.

In using the circuit shown, in connection with a three section step motor of the type described, it was noted that the motor operates synchronously with the pulses supplied from tube 162. The frequency of these pulses is determined by the output frequency of oscillator 172. Therefore, if dial 174 is calibrated for speed, the motor can be run at any constant speed within the accuracy of the oscillator, by merely setting the dial at the speed desired. By means of crystal control or other means, the oscillator can be made to provide quite accurate frequencies. Furthermore, a plurality of crystals of different frequency can be connected in the grid circuit of the oscillator, either singly or in groups, to produce various frequencies corresponding to the natural frequency of each crystal or corresponding to group or beat frequencies. The dial 174 can be connected with a suitable rotary or other switch so that it connects a different crystal or group in circuit, for each speed indication.

Direct current generator 39, driven by the motor as indicated in Figure 4, has its output terminals connected through opposed battery 69 to contacts 171 of switch 169. When oscillator 172 is to be used the switch is connected with contacts 170 and when generator 39 is to be used the switch blades are made to engage contacts 171. In that case the operation of the generator is as previously described, a charging pulse being applied to the grid of pulse tube 162 when the potential from battery 69 overcomes the opposing generator potential. The pulses from tube 162 then fire tubes 50a, 51a, and 52a, and consequently tubes 50, 51, and 52, in proper order to cause rotation of the motor. By varying the field of the generator, the voltage of battery 69, or the bias of grid 164, the phasing or points of energization of the motor windings can be predetermined.

Figure 17:
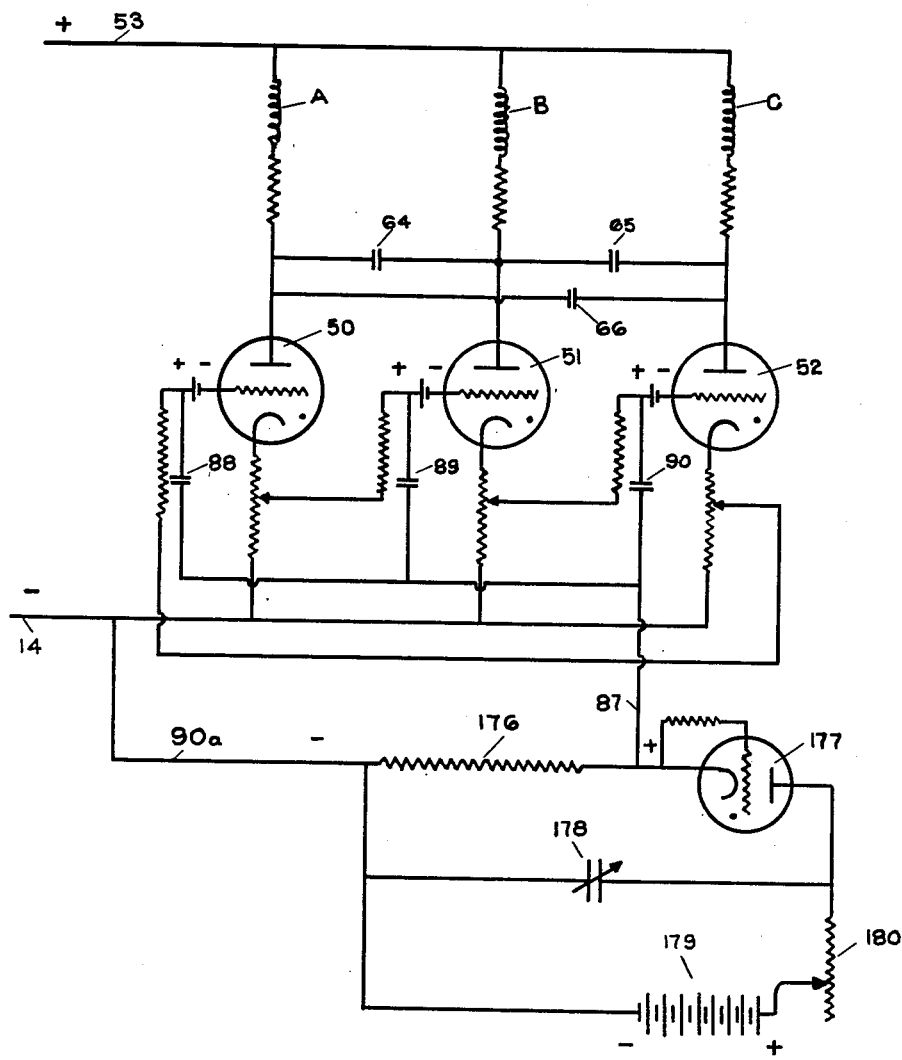
Figure 17 is a simplified circuit diagram for controlling step or plural section motors or other devices.

In Figure 17 the circuit is similar to that of Figure 6 but the pulses in conductors 87 and 90a are produced by potential drops across resistor 176 which is connected in series with gaseous relay tube 177 the grid of which may be connected with the cathode. Variable condenser 178 is connected across resistor 176 and tube 177 and the anode of the tube is connected to the positive terminal of battery or other source 179 through adjustable resistor 180. The negative terminal of battery 179 is connected to the low potential end of resistor 176 and to condenser 178 as shown. This constitutes a relaxation circuit since condenser 178 will be charged through resistor 180 until the firing potential of tube 177 is reached at which time current will be fed through the tube and resistor 176 until the condenser voltage drops below the firing potential. Tube 177 will then extinguish and the condenser will be charged again through resistor 180 until the firing potential is again reached. The cycle therefore is repeated at a rate dependent upon the capacitance of condenser 178, the voltage of battery 179, and the resistance of element 180. Any of these components may be varied to alter the frequency of the cyclic change. Therefore the pulse frequency, derived from the potential drop across resistor 176, can be applied to the grids of tubes 50, 51, and 52, in proper order as previously described, so that the field sections A, B, and C, will be energized at any desired frequency within the limits of operation of the circuit. Condenser 178 or one of the other variables may be calibrated in frequency, or revolutions per minute of the motor.

Figure 18:
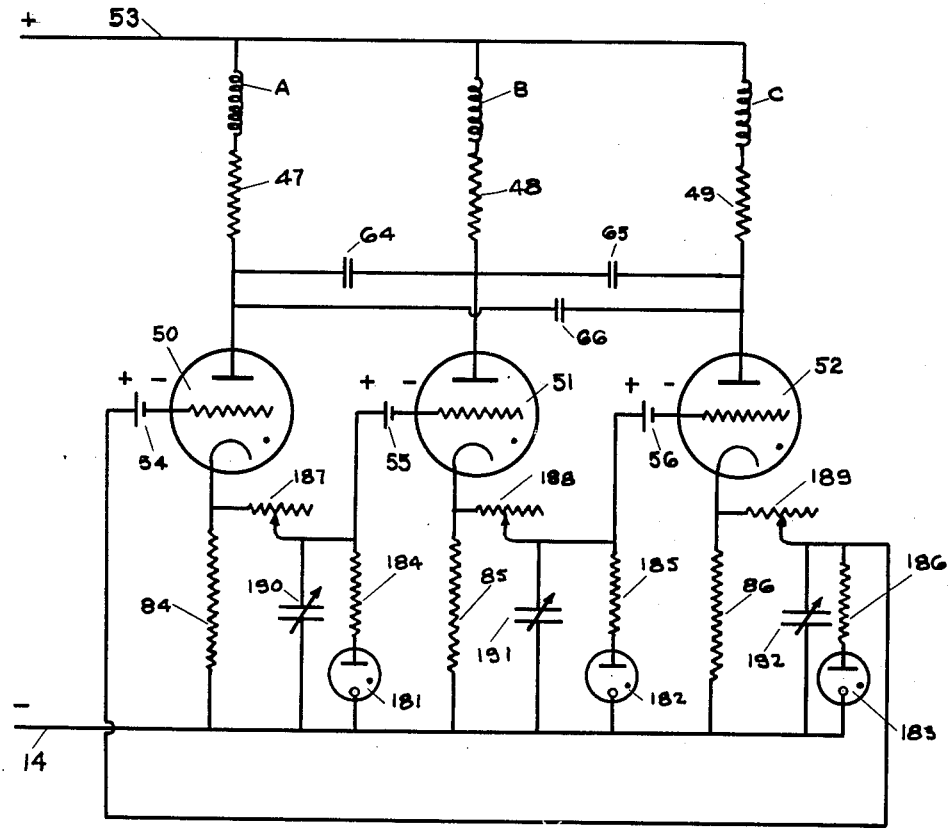
Figure 18 is another circuit diagram for controlling step or plural section motors or other devices.

In Figure 18, the circuit is similar to that of Figures 6 and 17 but additional means are provided to form a self timing or pulsing circuit. Like components are designated similarly as before. Gaseous relay tubes 181, 182, and 183 have their anodes connected to terminals of resistors 184, 185, and 186, respectively. The other terminals of these resistors are connected to the positive terminals of bias batteries 54, 55, and 56, respectively, and to the cathodes of tubes 50, 51, and 52 through variable resistors 187, 188, and 189 as indicated. The cathodes of tubes 181, 182, and 183 are connected to negative line 14. These tubes may have hot wire cathodes. Variable condensers 190, 191, and 192 are connected between the movable contacts of resistors 187, 188, and 189 and line conductor 14 as shown.

In operation, assume that tube 50 fires first so that current passes through resistor 84. This provides a charging potential for condenser 190 through timing resistor 187. When the potential of this condenser reaches the firing potential of tube 181 this tube will conduct current and the potential drop across resistor 184 and the tube will be applied to the grid of tube 51 to overcome the negative bias of battery 55 so that tube 51 will fire. When this happens tube 50 will be extinguished by means of condenser 64. When tube 51 passes current through resistor 85, the potential drop across this resistor similarly causes tube 182 to fire after a time interval as determined by the adjustment of resistor 188, or condenser 191, or both. When tube 182 fires the potential drop across resistor 185 and tube 182 is applied to the grid of tube 52 to fire that tube, which through condenser 65, extinguishes tube 51. Similarly, the firing of tube 183 fires tube 50, after an interval determined by the adjustment of resistor 189 or condenser 192, and when tube 50 fires, tube 52 is extinguished by means of condenser 66.

Therefore, by varying the resistors 187, 188, and 189, or condensers 190, 191, 192, the tubes 50, 51, and 52 can be automatically fired at predetermined intervals so that the motor sections A, B, and C are energized in proper sequence to cause rotation of the rotor. The condensers 190, 191, and 192, or resistors 187, 188, and 189 may be ganged so that they can be varied simultaneously by means of one adjusting control. The condensers or resistors or the common control can be calibrated in any desired manner. It should be noted that when each tube 50, 51, or 52, is extinguished, the driving potential for tube 181, 182, or 183 is eliminated. This prevents undesired oscillations. This circuit has advantages of simplicity, reliability and ease of adjustment.

Many other modifications of the electromagnetic device can be easily made by changing details, rearranging parts, or combining components of one modificaton with those of another, without departing from the principles of the invention.

The relaxation circuit comprising tube 177, resistor 180, potential source 179, condenser 178, and optionally resistor 176, may be connected between line 53 and brush 36 (Figure 1) so that the relaxation or other current interrupter 177a will time the energization of the field sections, and commutators 18, 19, and 20 will distribute the current to the sections in consecutive order to cause rotation. In this way only one tube need be used.

When it is desired to stop any of the motors described, a heavy stopping current, as compared to normal running current, can be applied to one or more sections to lock the rotor magnetically. For instance, switch 41 (Fig. 1) can be closed so that line resistor 41a is shunted. Likewise, in Figure 13, one of the tubes 128 or 129 can be made to carry a normal operating current and the other can be arranged, by means of reduced series resistance, to carry a much heavier braking or stopping current which can be applied by bridging distributor 127 and applying a positive bias to the tube adapted to carry the heavy current. These operations may be done simultaneously by means of relays or the like. Since, ordinarily, the stopping current is appplied for a short time only, it can be quite large as compared to the normal or running current. It is obvious that in Figures 3 and 12, the rotors shown could be fixed and the stators could be made to revolve.

In the claims the word "rotor" can be interpreted to mean one single rotor or a group rotor including several component rotors either coplanar or otherwise.

What I claim is:

1. In an electromagnetic device, a rotor and an associated stator one of which has a plurality of substantially evenly spaced magnetizable teeth and the other of which has a plurality of groups of magnetizable poles, said groups of poles being positionally phased with respect to said teeth, and means for magnetizing said groups of poles in predetermined order; said means including electron discharge tubes and relays connected therewith so that the energization of any one tube biases the succeeding tube for subsequent energization initiated by a pulse and inactivates the other said tubes to isolate one tube at a time electrically and means for producing initiating pulses to be applied to said tubes.

2. In an electromagnetic device, a rotor and an associated stator one of which has a plurality of substantially evenly spaced magnetizable teeth and the other of which has a plurality of groups of magnetizable poles, said groups of poles being positionally phased with respect to said teeth, and means for magnetizing said groups of poles in predetermined order; said magnetizing means including a plurality of electronic tubes and an associated buffer group of electronic tubes to cause firing of said first named tubes, an electronic counting circuit associated with said buffer tubes to cause operation thereof in sequence in accordance with the operation of said counting circuit, a pulsing tube to actuate said counting circuit, and means for timing the operation of said pulsing tube.

3. In an electromagnetic device, a rotor and an associated stator one of which has a plurality of substantially evenly spaced magnetizable teeth and the other of which has a plurality of groups of magnetizable poles, said groups of poles being positionally phased with respect to said teeth, and means for magnetizing said groups of poles in predetermined order, said means including an electronic counting circuit and an associated electronic relaxation circuit to time the operation of said counting circuit by applying repeated pulses thereto generated by said relaxation circuit.

4. In an electromagnetic device, in combination, a rotor and an associated stator one of which has a plurality of substantially evenly spaced magnetizable teeth and the other of which has a plurality of groups of magnetizable poles, said groups of poles being positionally phased with respect to said teeth, means for magnetizing said groups of poles in predetermined order, said magnetizing means including a plurality of electronic tubes connected in a counting circuit so that current flow through any one tube biases the next succeeding tube for operation as a result of application of the next pulse, and pulsing means to cause said tubes to conduct current in predetermined order, said pulsing means being responsive to movement of said rotor.

5. In an electromagnetic device, in combination, a rotor and an associated stator one of which has a plurality of substantially evenly spaced magnetizable teeth and the other of which has a plurality of groups of magnetizable poles, said groups of poles being positionally phased with respect to said teeth, means for magnetizing said groups of poles in predetermined order, and including means for applying to at least one said group of poles increased magnetization with respect to the magnetization of other groups to reduce the rate of rotation of said rotor.

6. In an electromagnetic device, in combination, a rotor and an associated stator one of which has a plurality of substantially evenly spaced magnetizable teeth and the other of which has a plurality of groups of magnetizable poles, said groups of poles being positionally phased with respect to said teeth, means for magnetizing said groups of poles in predetermined order, and including means for applying to at least one said group of poles increased magnetization with respect to the magnetization of other groups to stop said rotor.

7. In an electromagnetic device, in combination, a rotor and an associated stator one of which has a plurality of substantially evenly spaced magnetizable teeth and the other of which has a plurality of groups of magnetizable poles, said groups of poles being positionally phased with respect to said teeth, means for intermittently magnetizing said groups of poles in predetermined order, at a frequency per rotor revolution proportionate to the number of said teeth and including means for reducing the magnetization of said groups of poles intermittently at said frequency at predetermined speeds of said rotor.

8. In an electromagnetic device, in combination, a rotor and an associated stator one of which has a plurality of substantially evenly spaced magnetizable teeth and the other of which has a plurality of groups of magnetizable poles, said groups of poles being positionally phased with respect to said teeth, means for intermittently magnetizing said groups of poles in predetermined order, at a frequency per rotor revolution proportionate to the number of said teeth and including means for reducing the magnetization of said groups of poles intermittently at said frequency at predetermined speeds of said rotor, said reducing means including a pair of interconnected electronic tubes and a generator controlling operation of said tubes, said generator being driven by said rotor.

9. In an electromagnetic device, a stator having a plurality of substantially evenly spaced magnetizable teeth, an associated rotor having a plurality of groups of magnetizable poles, said groups of poles being positionally phased with respect to said stator teeth, the poles of any said group being adjacent and included within one segment of said rotor, and means for magnetizing said groups of poles in predetermined order.

10. In an electromagnetic device, a rotor and an associated stator one of which has a plurality of substantially evenly spaced magnetizable teeth and the other of which has a plurality of groups of magnetizable poles, said groups of poles being positionally phased with respect to said teeth, means for magnetizing said groups of poles in predetermined order, fluid damping means directly connected with said rotor for damping rotation thereof, said fluid damping means including means for causing greater damping action for one direction of rotor movement than for the opposite direction of movement thereof.

11. In an electromagnetic device, in combination, a rotor and an associated stator one of which has a plurality of substantially evenly spaced magnetizable teeth and the other of which has a plurality of groups of magnetizable poles, said groups of poles being positionally phased with respect to said teeth, means for magnetizing said groups of poles in predetermined order, and means for varying the degree of said pole magnetization in accordance with the relative position of the rotor and stator.

12. The device as set forth in claim 5, said means for applying increased magnetization being applied continuously until said rotor is stopped.

13. The device as set forth in claim 11, said means for varying the degree of said pole magnetization including a slipping contact switch operated by movement of said rotor.

14. The device as set forth in claim 11, said means for varying the degree of said pole magnetization including commutator means and associated brush means, and means for adjusting the relative position of said commutator means and said brush means.

15. The device as set forth in claim 11, said means for varying the degree of said pole magnetization including electronic tube means, and means operated by said rotor for varying the current passed through said tube means.

16. The device as set forth in claim 11, said means for varying the degree of said pole magnetization including electronic tube means, and a generator driven by said rotor for controlling current flow through said tube means.

ALBERT G. THOMAS.

REFERENCES CITED

The following references are of record in the file of this patent:

UNITED STATES PATENTS

| Number | Name | Date |
| --- | --- | --- |
| 1,408,758 | Meyer | Mar. 7, 1922 |
| 1,440,729 | French | Jan. 2, 1923 |
| 1,867,925 | Ruben | July 19, 1932 |
| 1,872,313 | Masterson | Aug. 16, 1932 |
| 2,249,029 | Mullerheim | July 15, 1941 |
| 2,321,699 | O'Brien | June 15, 1943 |
| 2,481,172 | Staggs | Sept. 6, 1949 |

FOREIGN PATENTS

| Number | Country | Date |
| --- | --- | --- |
| 474,859 | Great Britain | Nov. 9, 1937 |
| 746,276 | France | Mar. 7, 1933 |